United States Patent Office 3,641,191
Patented Feb. 8, 1972

3,641,191
METHOD FOR REDUCTION OF POLYMER FORMATION IN A PROCESS FOR CONVERTING ETHYLENE TO ALPHA OLEFINS
Herbert B. Fernald and William Gall, Glenshaw, and Russell G. Hay, Gibsonia, Pa., assignors to Gulf Research & Development Company, Pittsburgh, Pa.
No Drawing. Filed Feb. 27, 1970, Ser. No. 15,197
Int. Cl. C07c 3/10
U.S. Cl. 260—683.15 D         6 Claims

ABSTRACT OF THE DISCLOSURE

Solid polymer formation in the trialkylaluminum conversion of ethylene to higher alpha olefins is inhibited by the addition of various unsaturated hydrocarbon inhibitors. The presence of butadiene, for example, inhibits solid polymer formation without any substantial adverse effect on the efficiency of the process.

---

This invention relates to a method for reducing solid polymer formation in a process for the conversion of ethylene to alpha olefins by performing said process in the presence of a selected amount of an unsaturated hydrocarbon having from four to 12 carbon atoms.

In a process for the conversion of ethylene primarily to normal alpha olefins having from four to 40 carbon atoms in the presence of a trialkylaluminum, such as triethylaluminum, a small but highly deleterious quantity of what is believed to be solid polyethylene polymer is formed which deposits on reactor surfaces, interfering with heat transfer and necessitating frequent shutdowns of the reactor for removal of said polymer. In accordance with the present invention we have found that the presence of a selected amount of one or more unsaturated hydrocarbons, such as, for example, butadiene, isobutylene, dicyclopentadiene, isopentene, and the like, either singly or in combination, during the reaction inhibits formation of said polymer without any substantial adverse effect upon the efficiency of the process. Any amount of the unsaturated hydrocarbons which inhibits polymer formation can be employed. For example, the concentration of unsaturated hydrocarbons in the charge can be from about 0.1 to about 10 percent by weight, based upon the total weight thereof, preferably between about 0.3 to about 5.0 percent by weight. In this connection, it is believed that the unsaturated hydrocarbons of this invention function as free radicals or chain stoppers which inhibit higher polymer formation.

The stepwise conversion of gaseous ethylene to higher straight chain normally liquid olefins having the double bond in the terminal or alpha position, is believed to proceed as follows:

$$CH_2=CH_2 + CH_2=CH_2 \rightarrow CH_3-CH=CH_2$$

$$CH_3-CH_2-CH=CH_2 + CH_2=CH_2 \rightarrow$$
$$CH_3-CH_2-CH_2-CH_2-CH=CH_2$$

etc. This polymerization occurs catalytically in the presence of organometallic compounds, such as aluminum alkyls, which participate in the reaction. As the reaction proceeds in the presence of excess ethylene, an increasing quantity of gaseous ethylene is converted to liquid olefin so that the density of the reaction system progressively increases. The chemistry of the alpha olefin process can be described in terms of three major reactions. In the propagation (growth) reaction, an alkyl group on an aluminum atom containing $n$ ethylene units can add an ethylene molecule to become an alkyl group of $n+1$ ethylene units, as follows:

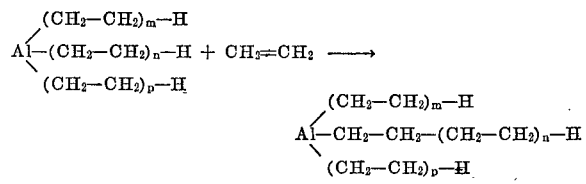

The transalkylation (displacement) reaction which occurs concurrently with the growth reaction consists of two steps. These are, first, thermal decomposition of any aluminum alkyl group to a hydride plus alpha olefin followed by a rapid reaction of the hydride with ethylene to regenerate an ethyl group which can start another growth cycle. The thermal decomposition is much slower than reaction of ethylene with a hydride and, therefore, is the rate-determining step for the over-all reaction.

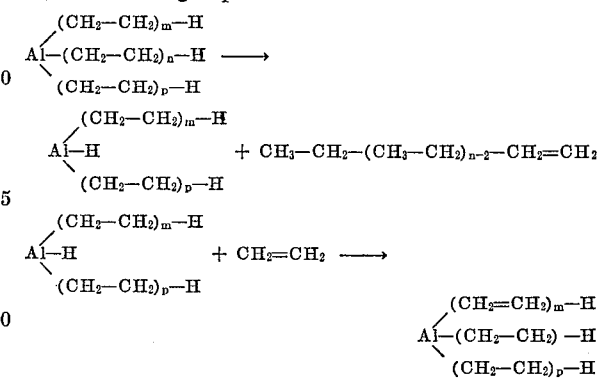

The growth and displacement reactions occur repeatedly as long as there is unreacted ethylene present. Therefore, the reaction is advantageously afforded a very high residence time. As long as there is free ethylene in the presence of catalyst in the reactor under reaction conditions, each mol of catalyst present will produce additional normal alpha olefin product. Therefore, a long residence time is conducive to a high alpha olefin yield per mol of catalyst, i.e., a high catalyst efficiency.

The third reaction is similar to the first except that the aluminum alkyl adds a product alpha olefin, rather than ethylene, to form a branched chain aluminum alkyl group. However, this structure is very unstable and rapidly decomposes to form a hydride and an olefin of vinylidene structure.

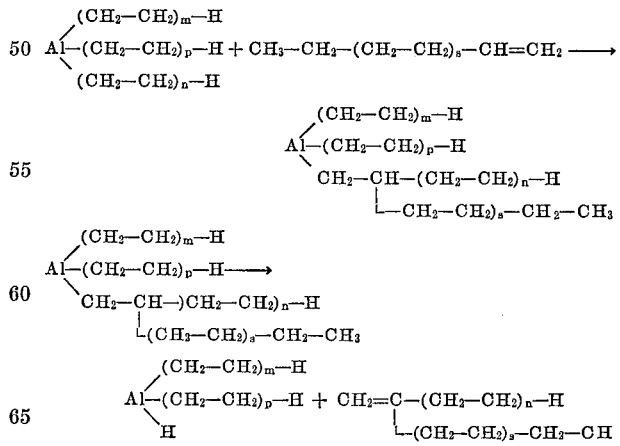

The decomposition is so rapid compared to the addition of another ethylene molecule to the branched alkyl that essentially all reactions of this type result in an olefin of vinylidene structure and regeneration of an aluminum ethyl group. As a result, there will be few, if any, alpha olefins with branching beyond the beta carbon.

Low temperature favors the growth reaction and will result in a higher average molecular weight product. At high temperatures, the average molecular weight will be lower because the transalkylation reaction predominates. The proportion of $C_{12}$ alpha olefin in the product tends to remain relatively constant with temperature changes within the most preferred range of this invention, with lower temperatures favoring a relatively higher proportion of product above $C_{12}$ and higher temperatures favoring a relatively higher proportion of product below $C_{12}$.

It is believed that the higher molecular weight alpha olefins produced at temperatures below reaction temperatures may be precursors to the solid polymers which it is the purpose of the present invention to inhibit. In performing the process of the present invention cold ethylene charge is preferably preheated substantially to full reaction temperature, i.e., to within about 5° F. or 10° F. of reaction temperature, prior to addition of catalyst thereto and commencement of the reaction. For example, when the reaction is performed continuously in a tubular reactor surrounding by a heat exchange medium, cold ethylene is charged to the inlet end of the tube and permitted to become preheated. The catalyst is injected into the tube at the downstream position therein at which ethylene has substantially reached full reaction temperature. In this manner, production of relatively high molecular weight alpha olefins is avoided.

In view of the fact that the production of normal alpha olefins is the object of the above reactions, ethylene is the sole olefin which can be employed in the charge. The normal alpha olefins produced will have from four to 40 carbon atoms and will be primarily liquid, with practically the only solid polymer produced being an undesired by-product which is inhibited in accordance with the method of the present invention. The normal alpha olefins produced, particularly the $C_{12}$, $C_{14}$ and $C_{16}$ alpha olefins, have high utility for the production of detergents.

The catalyst employed in the alpha olefin process can be defined by the following structural formula: $AlR_3$, wherein R is an alkyl group having from two to 40 carbon atoms, or even higher. One or two of said R's can be hydrogen. In the latter case one or both of the alkyls can have from one to 40 carbon atoms. Examples of catalysts which can be employed include $HAl(CH_3)_2$, $Al(C_2H_5)_3$, $Al(C_3H_7)_3$, $Al(C_4H_9)_3$, etc. The catalyst can be used as such, but preferably is employed with about 70 to about 99 percent by weight thereof of an inert hydrocarbon solvent, such as saturated aliphatics (n-pentane, isopentane, hexane, n-heptane, isooctane, n-dodecane, merusol oil, paraffinic oils, kerosene, etc.), alicyclics, such as cyclohexane, cyclopentane, etc., aromatics, such as benzene, toluene, etc. Since it is desired to produce a product predominating in a liquid alpha olefin, rather than a relatively high molecular weight solid polymer, the catalyst should be substantially free of catalyst components other than the catalysts defined above, such as, for example, $TiCl_4$, which tend to cause production of relatively high molecular weight solid polymers. The amount of catalyst required herein is not critical and can be from about $1 \times 10^{-4}$ to about $1 \times 10^{-2}$ mol per mol of ethylene.

The temperature of the reaction can range from about 285° to about 615° F., generally, from about 350° to about 430° F., preferably, and from about 380° to about 400° F., most preferably. The upper range of pressure employed is not critical and can be as high as about 1000 atmospheres or even higher, but the lower pressure range, however, is critical. The pressure should be sufficiently high that most of the alpha-olefin product is a liquid under the reaction conditions and so that the catalyst and most of the ethylene are dissolved or dispersed in said liquid. As soon as liquid alpha-olefin product is produced, the catalyst tends to entirely dissolve therein. It is important to have as high as possible a concentration of ethylene in the phase containing the catalyst, otherwise liquid olefin product rather than ethylene will tend to react with the catalyst to produce vinylidenes. Therefore, the pressure should be sufficiently high to force as much ethylene as possible into the liquid phase together with the catalyst. After there has been a conversion of 55 to 60 percent of the ethylene, there is sufficient liquid product to dissolve substantially all the ethylene and produce a single homogeneous phase in the reactor. Thus, the pressure in the reactor must at all times be at least about 500 or 1000, and preferably at least about 2000 pounds per square inch gauge, and most preferably in the 2000 to 4000 pounds per square inch range.

When it is desired to terminate the reaction, the product is withdrawn from the tubular reactor and is reduced in temperature and pressure, whereupon most of the gaseous olefins are flashed off. The liquid product is then treated in any suitable manner to deactivate the catalyst and the desired product fractions are recovered. The catalyst may be deactivated, for example, by contact with sufficient acid, base, water or alcohol to react stoichiometrically with the catalyst. When an acid or base is employed an aqueous layer is formed, which is then separated from the organic layer, and the remainder, including the solvent for the catalyst, can be separated into its component parts by distillation. If desired, the catalyst can be deactivated by contact with oxygen or halogens or any other material which reacts with and suitably destroys the catalytic activity of organometallic compounds. In a preferred method the aluminum catalyst is removed from the alpha-olefin product by reaction with caustic solution to form $Na_2OAl_2O_3$ plus paraffin as follows:

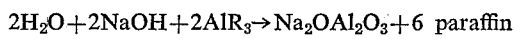

$$2H_2O + 2NaOH + 2AlR_3 \rightarrow Na_2OAl_2O_3 + 6 \text{ paraffin}$$

It is shown in Ser. No. 608,127, filed Jan. 9, 1967, now U.S. Pat. 3,482,000, that the amount of the desired normal alpha olefin in the product is always greater when the polymerization reaction is carried out in a tubular or coil reactor rather than in a single continuous stirred autoclave or series of stirred autoclaves for a given total conversion of ethylene to some kind of polymer. That application explains that in order to achive high selectivity toward normal alpha olefins the reactants and product should flow substantially as a column through the tube whereby there is a minimum of backmixing so that the percentage of normal alpha-olefin product increases throughout the length of the reactor. Since a given molecule of aluminum alkyl catalyst can undergo growth and transalkylation reactions repeatedly, it is important that ethylene charge and catalyst be permitted a high residence time in order to achieve a high catalyst efficiency, i.e., the production of a large amount of normal alpha olefins per mol of aluminum alkyl catalyst charged. A high residence time and avoidance of backmixing is most conveniently achieved by utilizing a very long tubular reactor.

EXAMPLE I

A series of tests were conducted to determine the polymer inhibiting effect of butadiene and other materials in an alpha olefin process. In the tests, a 15-liter tubular reactor having an inside diameter of 0.423 inch and an over-all length of 546 feet was continuously charged with a mixture of ethylene catalyst dissolved in a suitable solvent and the polymer inhibitor being tested. The ethylene and the combined catalyst and inhibitor were added to the reactor through separate lines and at spaced locations such that the ethylene charge could be preheated substantially up to the indicated reaction temperature before contacting the catalyst and inhibitor. Such preheating of ethylene was accomplished by completely submerging the reactor in a boiling water bath maintained under a preselected pressure and temperature. Downstream of the point of contact between the ethylene and the combined catalyst and inhibitor the boiling water served as a cooling bath to maintain a substantially uniform reactor temperature.

The reaction zone effluent consisting of predominantly normal alpha olefins, unreacted ethylene, catalyst, and very small amounts of polyethylene is continuously discharged through a product cooler where the temperature is reduced to 140° to 150° F. and thence through a high pressure filter for polymer collection. The pressure is then lowered by means of a reactor pressure control valve to 125 pounds per square inch gauge. The unreacted ethylene and butene product are removed by distillation procedures and the debutenized product is passed through a low pressure filter held at 140° to 150° F. and slightly above atmospheric pressure for polymer collection. After the test period usually of about 24 hours duration, the low and high pressure filters were removed from the system. The polymer which had collected on the walls of the reactor was removed by flushing the reactor at about 380° to 400° F. with several volumes (at least 4 to 5 volumes) of a suitable aromatic solvent such as toluene or xylene. The polymer so removed was recovered by concentrating and cooling the effluent solvent and filtering. The polymer collected in the low and high pressure filters and from the flush solvent were processed to remove solvent and product olefins in order to determine the weight of dry polyethylene produced in the test. The polyethylene produced was expressed as parts per million based on the total ethylene reacted.

eral illustrative examples, it is to be understood that the invention is not limited thereby and that various changes and modifications can be made without departing from the spirit and scope thereof.

We claim:
1. In a process wherein alpha olefins having from four to 40 carbon atoms are produced as a result of heating solely ethylene in the presence of solely a trialkylaluminum as catalyst in an inert solvent medium, the improvement which comprises carrying out said reaction in the added presence of about 0.1 to about 10 percent by weight, based on the total weight of the charge, of an unsaturated hydrocarbon selected from the group consisting of butadiene, isopentene, dicyclopentadiene and isobutylene.
2. The process of claim 1 wherein said unsaturated hydrocarbon is butadiene.
3. The process of claim 1 wherein said unsaturated hydrocarbon is isopentene.
4. The process of claim 1 wherein said unsaturated hydrocarbon is dicyclopentadiene.
5. The process of claim 1 wherein said unsaturated hydrocarbon is isobutylene.

TABLE I

| Run No. | Charge, percent by weight | Reaction temperature, °F. | Pressure p.s.i.g. | Conversion of $C_2H_4$ to α-olefins, percent | Feed [4] to reaction, volume [5] | Length of run, hours | Polymer produced [6] | Catalyst efficiency [7] | Reactor efficiency [8] |
|---|---|---|---|---|---|---|---|---|---|
| 1 | 89.68% $C_2H_4$, 8.78% cyclohexane, [1] 0.56% TEA, [2] 0.97% butadiene. [3] | 395 | 3,500 | 61 | 40.2 | 30 | 87 | 98.0 | 49.4 |
| 2 | 90.70% $C_2H_4$, 8.32% cyclohexane, 0.53% TEA, 0.45% butadiene | 395 | 3,500 | 66 | 31.7 | 24 | 198 | 112.8 | 56.8 |
| 3 | 86.52% $C_2H_4$, 12.19% cyclohexane, 0.67% TEA, 0.62% dicyclopentadiene [3] | 395 | 3,500 | 66 | 33.9 | 32 | 103 | 84.7 | 44.5 |
| 4 | No additive, 91.44% $C_2H_4$, 8.05% cyclohexane, 0.51% TEA | 395 | 31500 | 63 | 31.0 | 27 | 281 | 112 | 53.1 |
| 5 | 88.16% $C_2H_4$, 9.06% cyclohexane, 0.57% TEA, 2.21% isopentene [3] | 395 | 3,500 | 64 | 33.4 | 23 | 235 | 97 | 52.0 |
| 6 | 86.54% $C_2H_4$, 8.44% cyclohexane, 0.54% TEA, 4.48% Isobutylene [3] | 395 | 3,500 | 68 | 34.0 | 24 | 189 | 109 | 58.0 |

[1] Catalyst solvent.
[2] Triethylaluminum catalyst.
[3] Polymer inhibitor.
[4] Feed in pounds.
[5] Volume in cubic feet.
[6] Parts per million based on total ethylene reacted.
[7] Grams ethylene converted per gram catalyst.
[8] Grams ethylene converted per hour per milliliter of reactor volume per weight fraction of catalyst in the total reactor feed.

A study of the data in Table I clearly shows that there is an appreciable reduction in the amount of polymer formed when the process is carried out in the presence of a controlled amount of an unsaturated hydrocarbon. Note in Run No. 4 with no additive present 281 parts per million of polymer was produced and that in each of the remaining runs with additive present the amount of polymer was greatly reduced. Greatest reduction was obtained with butadiene and dicyclopentadiene. Neither catalyst nor reactor efficiency was adversely affected by the presence of additive.

While the present invention has been described in several

6. The process of claim 1 wherein the reaction temperature is in the range of about 285° to about 615° F.

References Cited
UNITED STATES PATENTS

| | | | |
|---|---|---|---|
| 3,482,000 | 12/1969 | Fernald et al. | 260—683.15 |
| 3,310,600 | 3/1967 | Ziegler et al. | 260—683.15 |
| 2,699,457 | 1/1955 | Ziegler et al. | 260—683.15 |
| 3,496,247 | 2/1970 | Yuguchi et al. | 260—680 |
| 2,781,410 | 2/1957 | Ziegler et al. | 260—683.15 |

PAUL M. COUGHLAN, Jr., Primary Examiner

UNITED STATES PATENT OFFICE
CERTIFICATE OF CORRECTION

Patent No. 3,641,191            Dated February 8, 1972

Inventor(s) Herbert B. Fernald, William Gall, Russell G. Hay

It is certified that error appears in the above-identified patent and that said Letters Patent are hereby corrected as shown below:

Column 1, line 56 should read

"$CH_2=CH_2 + CH_2 = CH_2 \longrightarrow CH_3-CH_2-CH=CH_2$".

Column 2, line 60 should read "$CH_2-CH-(CH_2-CH_2)_n-H$".

Column 2, line 66 should read

Column 3, line 21, "surrounding" should be "surrounded".

Column 4, line 60, please insert a comma after "ethylene".

Column 5, Table I, last column heading should read "Reactor efficiency[8]".

Table I, fourth line of column 4, "31500" should be "3500"

Signed and sealed this 20th day of June 1972.

(SEAL)
Attest:

EDWARD M. FLETCHER, JR.
Attesting Officer

ROBERT GOTTSCHALK
Commissioner of Patents